May 3, 1927.
H. E. KRAMMER
SECTIONAL FLYING BOAT
Filed July 6, 1918
1,627,184
2 Sheets-Sheet 1
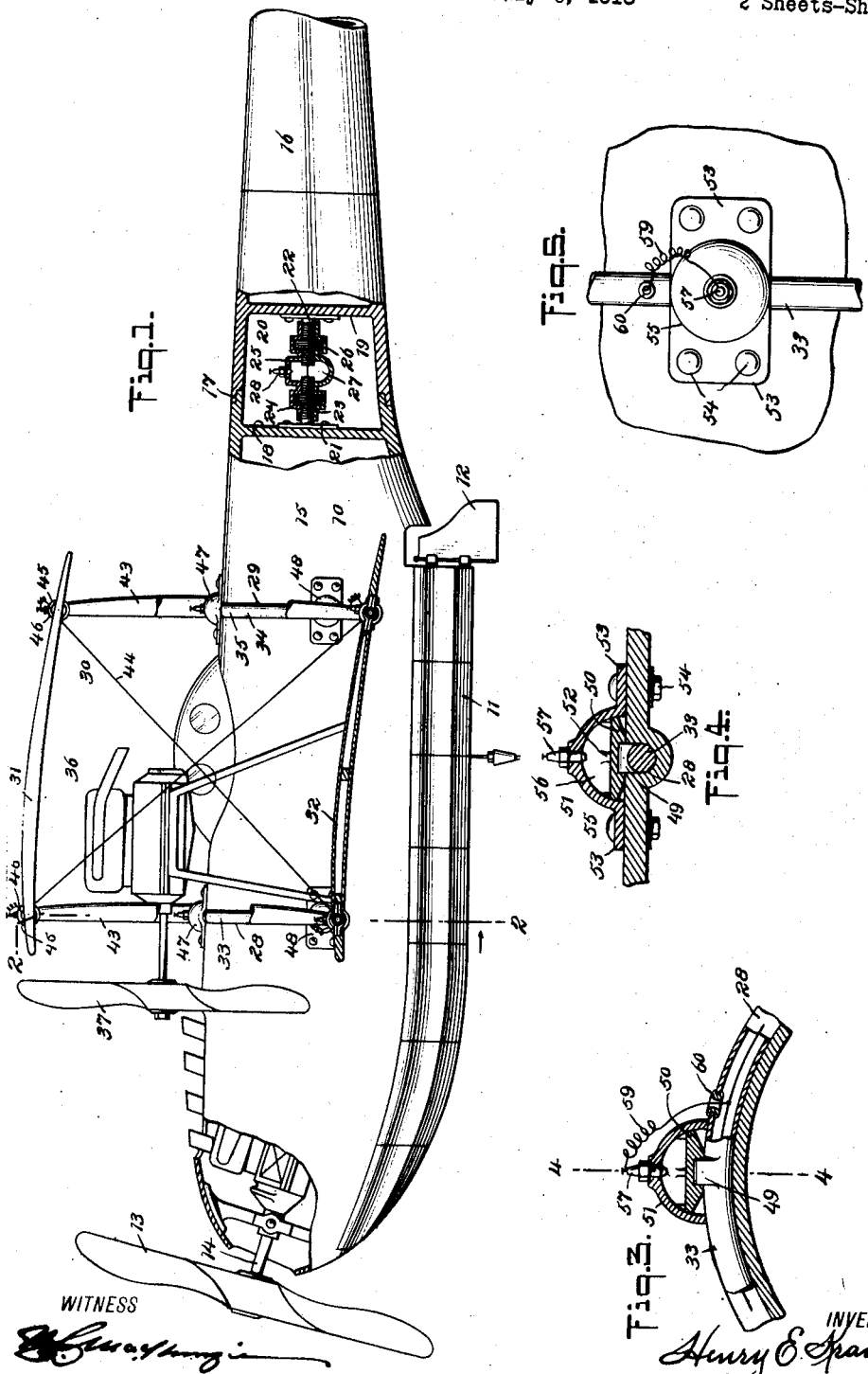

May 3, 1927.
H. E. KRAMMER
SECTIONAL FLYING BOAT
Filed July 6, 1918
1,627,184
2 Sheets-Sheet 2
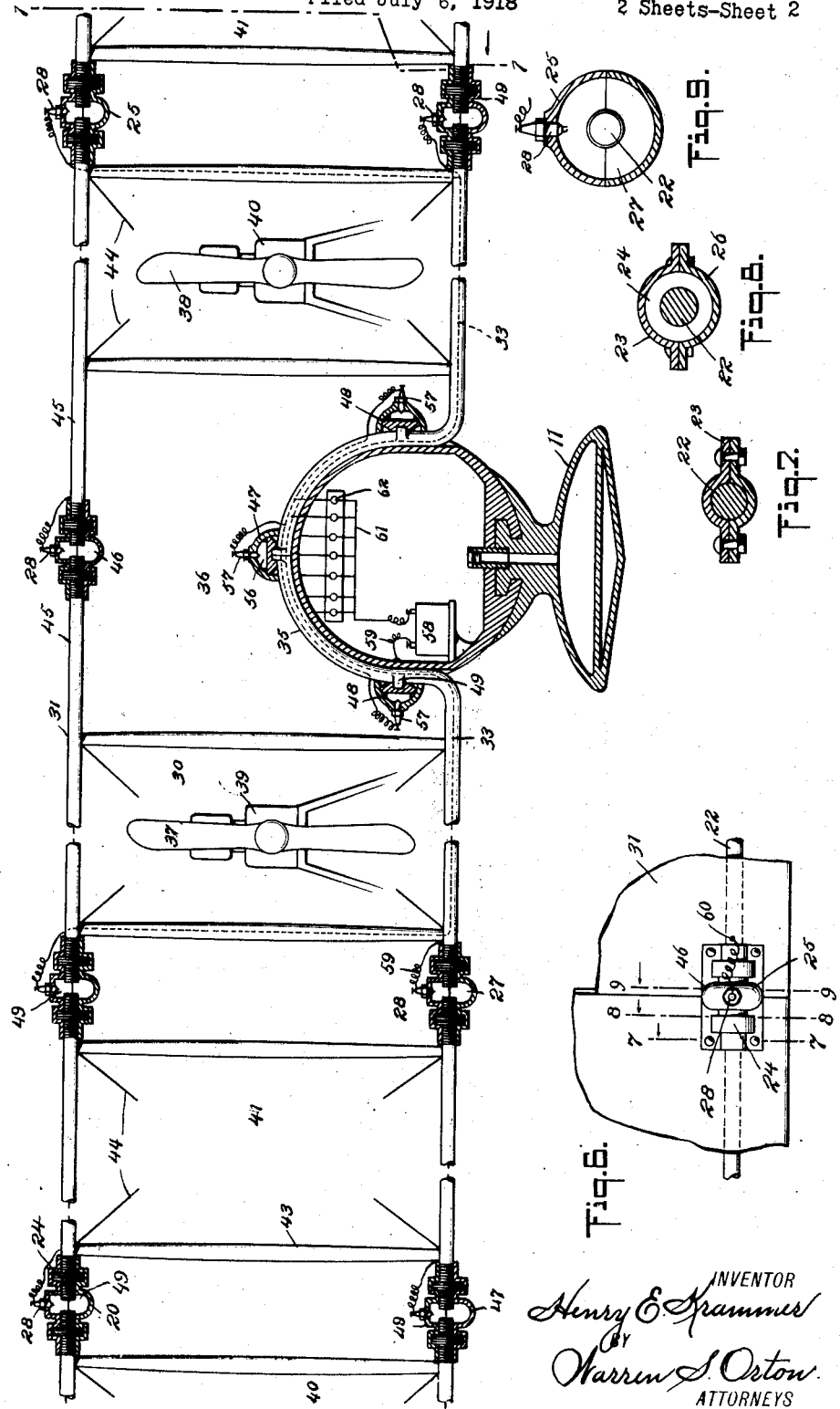

Patented May 3, 1927.

1,627,184

UNITED STATES PATENT OFFICE.

HENRY E. KRAMMER, OF NEW YORK, N. Y.

SECTIONAL FLYING BOAT.

Application filed July 6, 1918. Serial No. 243,564.

My invention relates in general to an aircraft of a type designed for navigating in both air and water commonly known as a flying boat and specifically relates to improvements in both the hull or fuselage element and in the wing supporting element of such a vehicle.

The invention contemplates a combined flying boat and aeroplane construction which will function as is usual with such devices, but which is formed of separable sections so designed that in case of an accident, the operator can get rid of some one or all of the sections which go to make up the supporting plane structure, and may drop off the tail portion of the fuselage as a flying boat or other marine craft.

Accordingly, the primary object of the invention is to provide a separable sectioned device of the class described which sections can be readily and selectively separated from other sections at will to change or modify the construction of the remaining device.

Another object of the invention is to provide independent propulsion means for both the aeroplane proper and for the fuselage element so that one propulsion mechanism may supplement the other when in flight and so that the fuselage may be utilized as a boat with a complete propelling organization when the fuselage element is separated from the aeroplane element.

A further object of the invention is to provide a type of propulsion for the fuselage element which can be adjusted in case of loss of a portion of the wing so as to compensate for the loss of supporting wing surface and thus control the ratio of lift to drift ratio of both the aeroplane when in flight and in the fuselage when functioning as a hydro-plane.

The invention further contemplates a construction for facilitating the salvage of the more important parts of the machine in case it becomes necessary to lose a part of the structure, as when parts are shot away with a resulting destroying of the equilibrium of the machine.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings:—

Figure 1 is a view in side elevation of the forward portion of a machine, illustrating a preferred embodiment of my invention taken on the line 1—1 of Figure 2 and showing parts broken away to illustrate internal construction;

Figure 2 is a transverse sectional view taken on the line 2—2 of Figure 1 and with parts of the plane broken away to save space; and showing the relative position of the aeroplane propulsion mechanism;

Figure 3 is a vertical sectional view of any one of the connections between the supporting wing structure and the fuselage and constitutes an enlarged showing of the coupling at the top of the fuselage in Figure 2;

Figure 4 is a vertical sectional view taken on the line 4—4 of Figure 3;

Figure 5 is a plan view looking down on the coupling shown in Figure 4;

Figure 6 is a plan view looking down upon one of the connections between the wing supporting sections shown in Figure 2; and Figures 7, 8 and 9 are vertical sectional views taken respectively on the lines 7—7 and 8—8 and 9—9 of Figure 6.

In the following description and in the claims, parts will be identified by specific names for convenience of expression but they are intended to be as generic in their application to similar parts as the art will permit.

In the drawings, there is shown a main passenger carrying body portion 10, hereinafter referred to as fuselage of a general torpedo form. This fuselage is provided with pontoon sections 11, rudder 12, propeller 13 mounted on a vertically adjustable propeller shaft 14 and otherwise corresponding to the disclosure in my co-pending application, entitled "Flying boat fuselage," filed under even date. Particularly described in connection with this disclosure, the fuselage includes an inclosed marine element forming portion 15 and a rearwardly extending tail portion 16 telescopically fitted together at a lap joint 17. It is understood that the tail portion is equipped with the usual steering and stabilizing mechanism usual with devices of this character. The body portion 15 is provided with a transversely disposed partition 18 adjacent its rear end which constitutes the rear body enclosing wall of this portion. Similarly the tail portion is provided with a transversely extending wall 19 adjacent its front end. The body portion 15 is held to the tail portion 16 by means of a coupling 20 positioned between the partitions 18 and 19. This coupling includes a pair of brackets 21 and 22 fastened respectively to the partitions 18 and 19 and each bracket is provided with a threaded post 23 projecting towards each other and with their adjacent ends slightly spaced apart. Each of the posts 23 is threaded and provided with a collar 24 adjustably mounted thereon. A three chambered tubular shell 25 extends between the posts with outer chambers 26 which constitute enclosing barrel shaped bearings for the collars 24. The central chamber 27 is of greater size than the bearings 26 and constitutes an explosive chamber. This chamber is designed to contain an explosive substance sufficient to blow out all connections between the posts 23. The explosive substance is designed to be detonated by the spark from a firing pin 28 constituting part of the electric control system hereinafter more fully described. The parts are so arranged that the exploding of the substance will rupture or weaken the shell to such an extent that the weight of the tail portion will be sufficient to cause it to drop down clear of the remaining main body portion of the fuselage.

The body portion 15 of the fuselage has its upper and outer sides recessed to provide a pair of longitudinally spaced apart grooves 28 and 29 designed to constitute a saddle for receiving the aeroplane element 30 of the device. This element is herein shown to resemble the conventional biplane aeroplane, but it is to be understood that this showing is merely illustrative of one form and a mono-plane or other structure may be substituted therefor. The aeroplane structure includes the conventional form of an upper supporting plane 31 and a lower supporting plane 32 extending on opposite sides of the body portion of the fuselage. The lower plane includes two longitudinally extending hollow rods 33 and 34 with their central portions curved upwardly in inverted U-shaped yokes 35 for fitting in the grooves 28 and 29. This construction provides a saddle seat for the aeroplane on the fuselage and tends to provide a secure connection.

This aeroplane construction differs from the conventional form in that it is made up of readily detachable sections, several of which are illustrated in Figure 2. This figure shows a main section 36 positioned above and on opposite sides of the fuselage. This section contains the important machinery and other expensive parts of an aeroplane and as illustrative of this organization there is shown a compound power plant mounted on this part of the aeroplane. More specifically, the power plant includes a pair of propellers 37 and 38 together with their engines 39 and 40. There is also shown certain outer sections, two of which constitute intermediate sections 41 and an extreme outer section 42 hereinafter referred to as an outbearing section. Each of these sections is complete in itself and includes struts 43 and wire bracings 44 as is usual in approved forms of such constructions, except that the struts and bracings of one section are entirely independent of each other section.

The main section is formed of two parts with their adjacent sides disposed in juxtaposition to the vertical medial line through the fuselage and so arranged that when the couplings for holding these parts in position are disrupted by any means, the two parts will be free to fall on each side of the fuselage and clear thereof so as to permit the fuselage to drop away from the supporting frame structure. In this way the fuselage may be utilized as a boat or other marine element in addition to its functions as a fuselage. The sections forming the upper plane rods 45 of the main section 46 are coupled together by means of a pair of couplings 46 and the lower plane rods are similarly connected at the top of the fuselage by means of a pair of couplings 47. The lower rods of each part of the main section are held to the fuselage by means of couplings 48. Similarly the rods of each section of the aeroplane structure outwardly of the main section is connected to the rods of the next adjacent section by means of couplings 49. It is understood that all of the couplings with the exception of the holding couplings 47 and 48 engaging the fuselage are similar to the coupling 20, described in detail for holding the tail portion to the body portion of the fuselage except that the ends of the rods are threaded to take the place of the threaded posts 22 and 23.

The couplings 47 and 48 are slightly different from those utilized to connect the wing sections in that they are curved so as to conform to the configuration of the parts engaging the fuselage and at the same time are utilized to provide means for securing the aeroplane structure to the fuselage. Referring particularly to the disclosure in Figures 3–5, it is noted that the rod 33 is provided with a square upstanding finger 49 engaging in a similarly shaped recess on the underside of a retaining plate 50. This retaining plate is held in position by means of a dome-shaped cap 51 fitted over the plate and provided internally thereof with lugs 52 engaging the top of the plate at four points thereof for the purpose of holding the same in engagement with the finger 49. Opposite sides of the cap are provided with outstanding flanges 53 through which extend bolts 54 for fastening the cap to the fuselage on opposite sides of the grooves. This cap is provided with a peripheral groove 55 constituting a weakened portion for insuring the braking of the cap from the bolted part when the same is exploded. The cap incloses an explosive chamber 56 positioned above the plate 50 designed to contain an explosive substance, fired by means of a firing gun pin 57.

Each of the firing pins 28 and 57 is connected to a source of electric energy presented by a battery 58 mounted in the fuselage. This connection is provided by means of wiring circuits including conductors 59 which pass through openings 60 in the rods 33 and 34 as shown in dotted lines in Figure 2 and in detail in Figure 3. The several electric firing circuits are controlled from a switchboard 61 positioned in the fuselage convenient to the operator. The switchboard is so wired that one button for instance that numbered 62 will control the circuits leading to the couplings at the outermost plane sections and arranged so that pressing the button will simultaneously close the circuits through all of the explosive devices, thus permitting the simultaneous dropping of the two outer wing sections 42 at the same time and thus tend to preserve the equilibrium of the machine. Other buttons of the switchboard will control in succession, the dropping of the next nearer sections and still another button will control the couplings 20 between the tail portion and the body portion of the fuselage. By this construction the operator in the fuselage can get rid of the plane sections in order, retaining the last main section with its power plant until circumstances forces him to abandon the aeroplane features of the device. In case the operator has to get rid of the main section he actuates the button which will simultaneously rupture the couplings 46, 47 and 48 thus permitting the fuselage to drop away from the supporting plane and float on the water, retaining the tail section in case he desired to use the fuselage as a hydro-plane.

As the fuselage is provided with an aerial propeller 13 the shaft 14 of which is mounted for adjustment in a vertical medial plane of the fuselage, it is possible while in flight to utilize the propeller to vary the lift to drift ratio of the machine and as the different supporting plane sections drop off the propeller may be shifted so as to increase the lift factor of the ratio and thus compensate for the loss of the supporting wing surface. When the main body portion passes from its function as a fuselage to its use as a marine element, propeller 13 is shifted so as to obtain the most effected utilization of this member in its propulsion of the boat so formed.

In operation and considering that the device is acting as an aeroplane, it is to be understood that the device will function as is usual with such devices. The invention particularly features the facility for getting rid of aeroplane sections while offering the greatest possibility of salvaging important parts such as the aeroplane power plant. However, if this power plant and its supporting parts must be sacrificed the operator can still retain the fuselage as a boat with all of its facilities for driving and guiding the same.

The two distinct power plants provide for a powerful machine capable of high speed in its forward movement and the shiftable propeller of which cooperates with the sustaining planes and permits of the sustaining of a heavy load while in flight. Further this shiftable propeller may be utilized to facilitate the launching of the machine from the ground or water and when reversed in direction can be utilized as a braking means to effect an easy and safe landing either on land or water.

As the parts other than the part carrying the operator and passengers can be dispensed with in case of accident and the passenger carrying part is capable of acting as a propelled boat, there results a saving of life as well as a possible saving of dispensed parts in a rescuing expedition.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. A vehicle constituting a combined aeroplane and a marine element including a fuselage formed of separable sections and provided with a propelling mechanism and a supporting wing structure formed of separable sections, one of which is provided with a propelling mechanism, means including a control actuated from the fuselage section provided with the propelling mechanism for discharging in order, wing sections other than the one provided with the propelling mechanism, the section provided with said mechanism and a fuselage section other than the one provided with the control.

2. In a device of the class described, the combination of a fuselage, a supporting wing structure including a main section positioned on the fuselage and outbearing sections forming continuations of the main section, means possessed of latent disruptive energy means for coupling the outbearing sections to the main section and means for simultaneously vitalizing said energy means causing said coupling means to become inoperative thereby permitting both outbearing sections to fall clear of the main section.

3. In a device of the class described, the combination of a fuselage, a supporting wing structure including a main section positioned on the fuselage and outbearing sections forming continuations of the main section, means possessed of latent disruptive energy means for coupling the outbearing sections to the main section, means for simultaneously vitalizing said energy means causing said coupling means to become inoperative thereby permitting both outbearing sections to fall clear of the main section, said main section being divisible into a plurality of parts, coupling means for securing the parts in position on the fuselage and means for causing said last named coupling means to become inoperative thereby permitting the separation of fuselage from the main section.

4. In a device of the class described, the combination of a fuselage and an aeroplane element comprising a main portion, a power plant carried thereby and a portion of secondary value compared to said main portion, means possessed of latent disruptive energy means for coupling said secondary portion to said main portion and vitalizing means for said energy means, controlled from the main portion for breaking said coupling thereby to permit the secondary portion to fall clear of the main portion.

5. In a device of the class described, the combination with a supporting plane structure including a main section provided with propelling mechanism, and outbearing sections constituting extensions of the main section from opposite ends thereof, a floatable fuselage supported by said plane structure while in flight, said fuselage provided with a propeller having an axle shiftable in a vertical plane, means for disconnecting said outbearing sections while in flight and means for adjusting the direction of said axle thereby to vary the drift to lift ratio of the device when deprived of the supporting effect of said outbearing sections.

6. In a device of the class described, the combination with a supporting plane structure including a main section provided with propelling mechanism, and outbearing sections constituting extensions of the main section from opposite ends thereof, a floatable fuselage supported by said plane structure while in flight, said fuselage provided with a propeller having an axle shiftable in a vertical plane, means for disconnecting said outbearing sections while in flight, means for adjusting the direction of said axle thereby to vary the drift to lift ratio of the device when deprived of the supporting effect of said outbearing sections and means for dissociating the supporting plane structure from the fuselage while in flight thereby permitting the fuselage to constitute a marine element and said fuselage propeller adapted to be shifted to propel the marine element while floating.

7. A vehicle constituting a combined aeroplane and a marine element including a fuselage formed of separable sections and provided with a propelling mechanism and a supporting wing structure formed of separable sections, one of which is provided with a propelling mechanism, means including a control actuated from the fuselage section provided with the propelling mechanism for discharging in order, wing sections other than the one provided with the propelling mechanism, the section provided with said mechanism and a fuselage section other than the one provided with the control, said fuselage propelling mechanism being shiftable to correspond to the different conditions of the vehicle.

8. In a device of the class described, a fuselage including a body portion provided with a transverse partition adjacent its rear end, a tail portion fitted to the end of said main portion and provided with a transverse partition adjacent its forward end, a coupling extending between the partitions for securing the tail portion to the body portion, said coupling including an explosive chamber adapted to contain an explosive for rupturing the coupling.

9. In a device of the class described, a fuselage including a body portion and a separable tail portion, means possessed of latent disruptive energy for coupling the tail portion to the body portion and means including a control in the body portion for vitalizing said energy means thereby causing said coupling means to become inoperative.

10. In a device of the class described, a fuselage including a body portion and a separable tail portion, a socketed connection between said portions, locking means possessing latent disruptive energy means for fastening the portions in position and means operable from a distance to vitalize said energy means for releasing said locking means.

11. In a device of the class described, the combination of a fuselage including separable sections and provided with means for receiving a supporting wing structure, a complete wing structure constituting a unit adapted to be separated from the fuselage and mounted on said means, said wing structure formed of separable sections and means including a control mechanism in the fuselage for selectively separating, at will, the fuselage from the wing structure, one wing section from another, or one fuselage section from another.

12. In a device of the class described, the combination of a fuselage provided with means forming a support for a wing structure, a supporting wing structure including a main portion extending above the fuselage and shaped to constitute a saddle fitting said supporting means, means for securing said saddle in place and means acting on said securing means for rendering the same inoperative thereby permitting the fuselage to drop away from the supporting wing structure.

13. In a device of the class described, the combination of a fuselage, a supporting wing structure including a two-part main section, said fuselage provided with means forming a support for the wing structure, and said main section shaped to constitute a saddle fitting said supporting means, the two parts of the main section jointed in the vertical medial plane of the fuselage whereby when separated they will be free to fall on opposite sides of the fuselage, coupling means at the jointure of the parts for holding the same in position and means for causing the coupling means to become inoperative.

14. In a device of the class described, the combination of two separable elements, a mechanical coupling means for securing said elements in position, said elements disposed relative to each other so that one will fall clear of the other when said coupling means is ruptured, a charge of explosive substance associated with said coupling means to rupture the same, firing means operatively associated with said explosive substance to detonate the same, and a control therefor spaced from said firing means whereby one of the elements may be discarded.

15. In a device of the class described, the combination of two aeroplane elements, a hollow member connecting the two, a charge of explosive substance associated with said hollow member and firing means controlled from a distance for rupturing said hollow member.

16. In a device of the class described, an aeroplane element comprising a main portion, a power plant carried thereby and a portion of secondary value compared to said main portion, means for coupling said secondary portion to said main portion, an explosive associated with said coupling means to destroy the same, and means controlled from the main portion for breaking said coupling thereby to permit the secondary portion to fall clear of the main portion.

17. In a device of the class described, an aeroplane element comprising a main portion, a power plant carried thereby and a portion of secondary value compared to said main portion, means for coupling said secondary portion to said main portion, an explosive associated with said coupling means to destroy the same, means controlled from the main portion for breaking said coupling thereby to permit the secondary portion to fall clear of the main portion and means for firing the explosive and a control for said firing means.

18. In a device of the class described, the combination of a fuselage including separable sections and provided with means for receiving a supporting wing structure, a complete wing structure constituting a unit adapted to be separated from the fuselage and mounted on said means, said wing structure formed of separable sections, means for coupling the sections together and selective means acting on said coupling, means for permitting certain sections of the fuselage or wing sections to become separated from other sections.

19. In a device of the class described, the combination of two aeroplane elements, one supporting the other, a coupling between said elements for holding the same in relative position, said coupling including an enclosing shell adapted to contain an explosive substance for destroying the couple between said elements thereby to permit the supported element to fall clear of the supporting element.

20. In a device of the class described, the combination of two aeroplane elements, one supporting the other, a coupling between said elements for holding the same in relative position, said coupling including an enclosing shell adapted to contain an explosive substance for destroying the couple between said elements thereby to permit the supported element to fall clear of the supporting element and electrically actuated firing means actuated from a distance for detonating said explosive substance.

21. In a device of the class described, a fuselage including a body portion and a separable tail portion, means for coupling the tail portion to the body portion, and explosive means associated with said coupling means for destroying the operativeness of the coupling means thereby permitting the tail section to fall away from the body portion.

22. In a flying boat, the combination of a plane supporting structure provided with a power plant, and air propellers actuated from said plant, a fuselage carried by said plane structure, a power plant carried by said fuselage, an air propeller actuated by the fuselage power plant, the shaft of said last named propeller being inclined at an angle to the axis of the plane carried air propellers and said fuselage propeller adapted to contribute a large lift to drift ratio to the propulsion of the flying boat.

23. A flying boat including an aeroplane unit and a boat unit, the boat unit provided with individual marine steering means, uniting means for the units, and expansible means actuable while the flying boat is in operation for rendering the uniting means ineffective as such, to thereby release the units.

24. An airplane composed of separable flying elements, and uniting means for said elements possessed of expansible energy means for rupturing said uniting means.

25. An airplane composed of separable elements, uniting means for said elements possessed of expansible energy means for rupturing said uniting means and manually controlled means for vitalizing said energy means.

26. An airplane composed of separable elements, uniting means for said elements possessed of expansible energy means for rupturing said uniting means and manually controlled means for selectively vitalizing said energy means.

27. An airplane whose supporting unit is composed of separable sections, and uniting means for said sections possessed of expansible energy means for rupturing said uniting means.

28. An airplane whose supporting unit is composed of separable sections, uniting means for said sections possessed of expansible energy means for rupturing said uniting means and manually controlled means for vitalizing said energy means.

29. An airplane whose supporting unit is composed of separable sections, uniting means for said sections possessed of expansible energy means for rupturing said uniting means and manually controlled means for selectively vitalizing said energy means.

30. In a flying boat, in combination, an aerial support unit, a power plant and propulsive means operable thereby carried by said unit, a floatation unit, a power plant including a forwardly mounted propeller carried by said floatation unit, and means for moving the power plant to vary the axial inclination of the propeller for said floatation unit, to increase its lift to drift propulsion ratio.

31. An aircraft composed of separable elements and units, integral uniting means for said elements and units, and means for sundering said uniting means to detach said elements and units.

32. An aircraft composed of separable elements and units, integral uniting means for said elements and units, means for sundering said uniting means to thus detach said elements and units, and means for propelling, steering and stabilizing a detached unit.

33. An aircraft composed of separable elements and units, integral uniting means for said elements and units, means for separating said elements and units, and manual control means for vitalizing said separating means.

34. An aircraft composed of separable elements and units, integral uniting means for said elements and units, means for separating said elements and units, and manual control means for selectively vitalizing said separating means.

35. An aircraft supporting unit composed of separable supporting elements, integral uniting means for said elements, and means for sundering said uniting means to permit the detachment of said elements.

36. An aircraft supporting unit composed of superposed separable supporting elements, integral uniting means for said elements, and means for sundering said uniting means to permit the detachment of said elements.

37. An aircraft composed of superposed separable elements and units, integral uniting means for said elements and units, and means for sundering said uniting means to permit the detachment of said elements and units.

38. An aircraft composed of a number of united elements, certain of said elements being powered, and expansible means for selectively separating said elements one from another.

39. An aircraft composed of a number of individually powered units, uniting means therefor, and expansible means selectively actuable while the aircraft is in operation, for rendering the uniting means ineffective as such, to thereby release certain of the units.

Signed at New York City, in the county of New York and State of New York this 3rd day of July, A. D. 1918.

HENRY E. KRAMMER.